United States Patent
Sei et al.

(10) Patent No.: US 9,539,916 B2
(45) Date of Patent: Jan. 10, 2017

(54) VEHICLE SEAT

(75) Inventors: Kousuke Sei, Toyota (JP); Yukinori Sugiura, Nisshin (JP); Ikuko Ota, Nagoya (JP); Tatsuya Ono, Toyota (JP); Takashi Okada, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 13/097,384

(22) Filed: Apr. 29, 2011

(65) Prior Publication Data

US 2011/0266850 A1 Nov. 3, 2011

(30) Foreign Application Priority Data

Apr. 30, 2010 (JP) ................ 2010-105041

(51) Int. Cl.
*B60N 2/06* (2006.01)
*B60N 2/08* (2006.01)
*B60N 2/68* (2006.01)

(52) U.S. Cl.
CPC ........... *B60N 2/0825* (2013.01); *B60N 2/0843* (2013.01); *B60N 2/68* (2013.01)

(58) Field of Classification Search
CPC ...................................................... B60N 2/06
USPC .......... 297/452.18, 341, 344.1, 429
See application file for complete search history.

(56) References Cited

U.S. PATENT DOCUMENTS 3,185,431 A * 5/1965 Henry-Biabaud ............ 248/429
3,288,422 A * 11/1966 Krause ...................... 248/429 X
4,015,877 A * 4/1977 Button .......................... 297/341
4,043,593 A * 8/1977 Turner .......................... 297/341
4,595,164 A * 6/1986 Froutzis et al. .............. 248/429
2010/0133407 A1 6/2010 Fujieda et al.

FOREIGN PATENT DOCUMENTS

| JP | 2-76938 | 6/1990 |
|----|---------|--------|
| JP | 2-100837 | 8/1990 |
| JP | 07051145 | 2/1995 |
| JP | 2001-87077 | 4/2001 |
| JP | 2002-283885 | 10/2002 |
| WO | 2006/022185 | 3/2006 |

OTHER PUBLICATIONS

U.S. Appl. No. 13/075,472 to Taiyo Otsuka, filed Mar. 30, 2011.

(Continued)

*Primary Examiner* — Anthony D Barfield
(74) *Attorney, Agent, or Firm* — Greenblum & Bernstein, P.L.C.

(57) ABSTRACT

A vehicle seat includes a seat cushion, and a sliding apparatus provided underneath the seat cushion. The sliding apparatus has a lower rail, and an upper rail that slidably attaches to the lower rail. The seat cushion has a frame body that includes a pipe member. The pipe member has a main body portion that extends along an end edge of the seat cushion, a leg portion that extends downward toward the upper rail from an end portion of the main body portion, and a mounting portion that extends from a lower end portion of the leg portion and is flattened such that a hollow portion of the pipe member is small, all integrated together. The mounting portion has a flat surface that abuts against the upper rail, and is mounted to the upper rail.

16 Claims, 5 Drawing Sheets

(56) References Cited

OTHER PUBLICATIONS

U.S. Appl. No. 13/185,829 to Yoshiro Hara et al., filed Jul. 19, 2011.
China Office action, dated Dec. 10, 2012 along with an english translation thereof.
Japanese Office action, dated Nov. 19, 2013, along with an English-language translation thereof.

* cited by examiner

VEHICLE SEAT

INCORPORATION BY REFERENCE

The disclosure of Japanese Patent Application No. 2010-105041 filed on Apr. 30, 2010 including the specification, drawings and abstract is incorporated herein by reference in its entirety.

BACKGROUND OF THE INVENTION

1. Field of the Invention

The invention relates to a vehicle seat mounted in a vehicle or the like.

2. Description of the Related Art

A vehicle seat according to related art has a seat cushion and a sliding apparatus provided beneath the seat cushion, for example (see Japanese Patent Application Publication No. 7-51145 (JP-A-7-51145)). The sliding device has a lower rail and an upper rail that is slidably attached to the lower rail. The seat cushion has a frame that includes a pipe member. The pipe member is attached to the upper rail by a bracket.

However, in order to reduce the number of parts, there is a need for a vehicle seat in which the pipe member can be directly and easily attached to the upper rail.

SUMMARY OF THE INVENTION

One aspect of the invention relates to a vehicle seat that includes a seat cushion, and a sliding apparatus provided underneath the seat cushion. The sliding apparatus has a lower rail, and an upper rail that slidably attaches to the lower rail. The seat cushion has a frame body that includes a pipe member. The pipe member has a main body portion that extends along an end edge of the seat cushion, a leg portion that extends downward toward the upper rail from an end portion of the main body portion, and a mounting portion that extends from a lower end portion of the leg portion and is flattened such that a hollow portion of the pipe member is small, all integrated together. The mounting portion has a flat surface that abuts against the upper rail, and is mounted to the upper rail.

Therefore, the flat surface of the flattened mounting portion of the pipe member abuts against the upper rail. Accordingly, the pipe member can be directly and easily attached to the upper rail without using a bracket. Thus, the number of parts of the vehicle seat can be reduced.

In the vehicle seat according to the aspect described above, the flat surface of the mounting portion may abut against an upper surface of the upper rail. Also, the mounting portion may be mounted to the upper rail by a bolt that extends through the upper rail and the mounting portion from underneath the upper rail, and a nut that screws onto the bolt, while the upper rail is made to protrude with respect to the lower rail.

In the vehicle seat according to the aspect described above, the main body portion of the pipe member may extend in a longitudinal direction of the upper rail, the leg portion may extend downward from one end portion of the main body portion, and the mounting portion may extend in the longitudinal direction of the upper rail and toward the other end portion of the main body portion from the lower end portion of the leg portion, and abut against an upper surface of the upper rail.

In the vehicle seat according to the aspect described above, the one end portion of the main body portion may be a front end portion.

In the vehicle seat according to the aspect described above, the hollow portion of the mounting portion may be smaller than a hollow portion of another portion of the pipe member.

In the vehicle seat according to the aspect described above, the leg portion may be curved in an arc shape.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

One example embodiment of the invention will now be described with reference to FIGS. 1 to 3. A vehicle seat 1 is a seat that is mounted in a vehicle, and includes a seat cushion 2, a seat back 3, and a headrest 4, as shown in FIG. 1.

Figure 1:
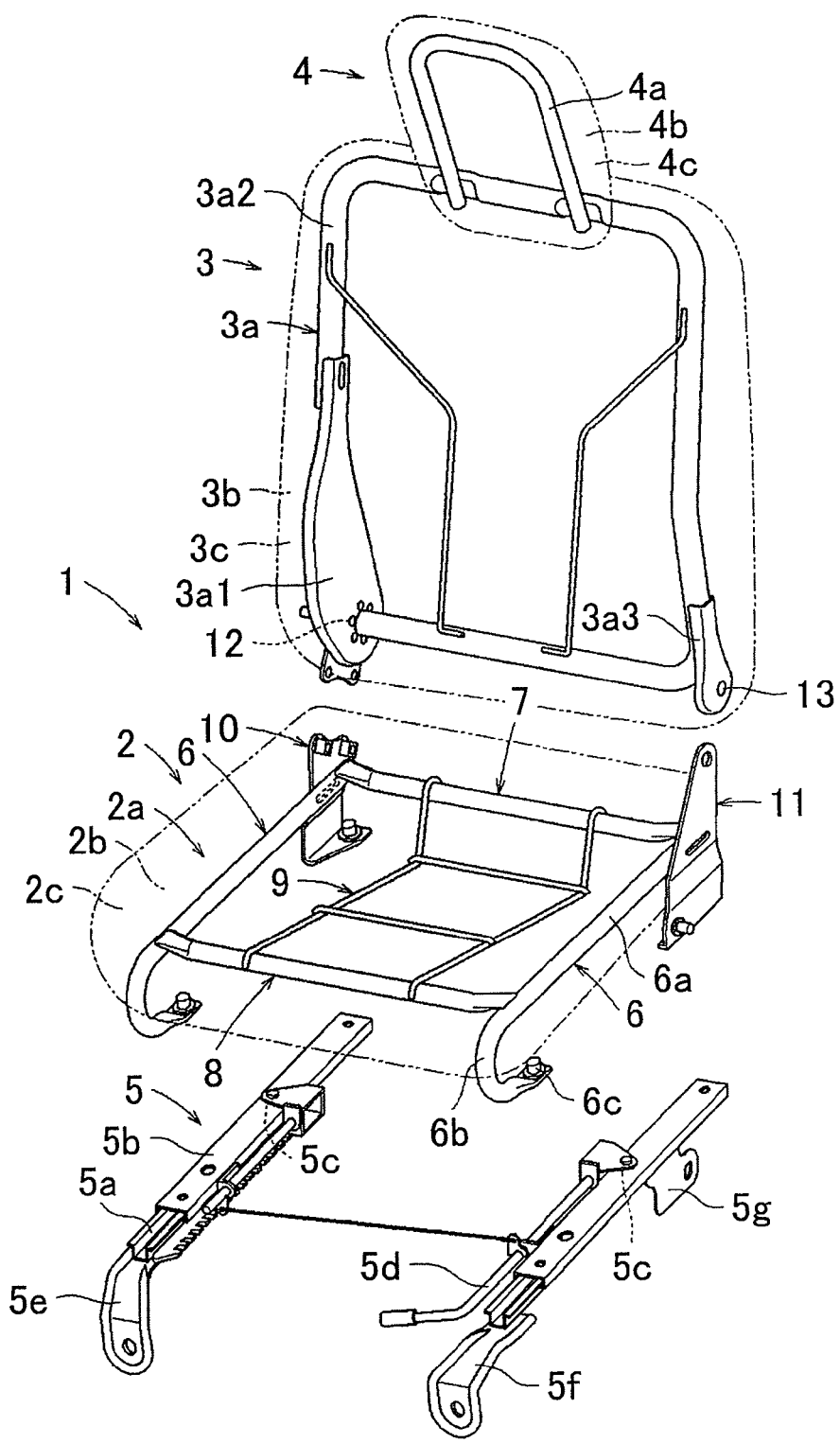
FIG. 1 is an exploded perspective view of a vehicle seat according to one example embodiment of the invention.

The seat cushion 2, the seat back 3, and the headrest 4 each have a frame body 2a to 4a, a pad 2b to 4b, and a cover 2c to 4c, as shown in FIG. 1. The pads 2b to 4b are each made from elastic material such as urethane foam, and are attached to the frame bodies 2a to 4a. The covers 2c to 4c are attached to the surfaces of the pads 2b to 4b.

Figure 2:
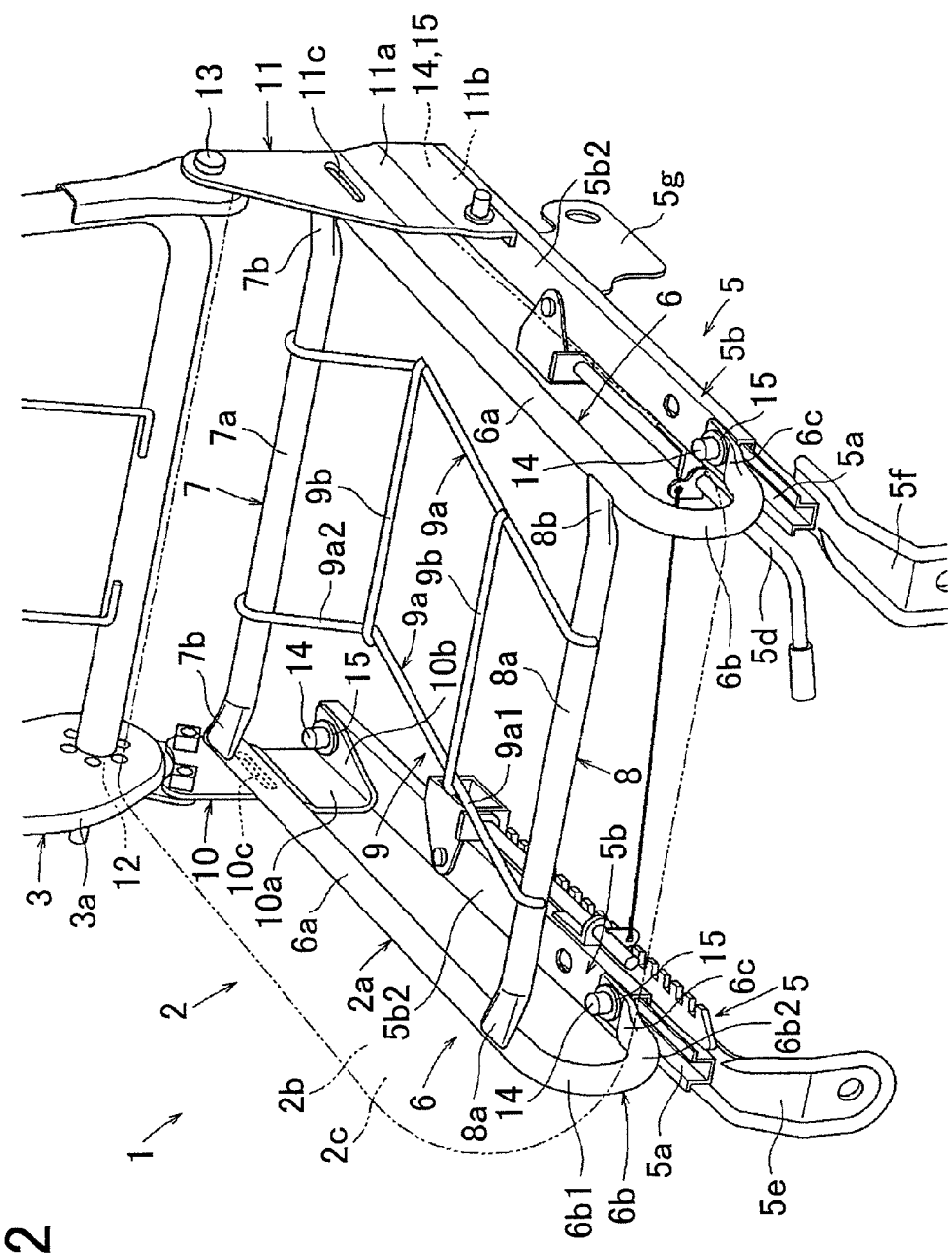
FIG. 2 is a partial perspective view of the vehicle seat at an area near a seat cushion.

The frame body 2a of the seat cushion 2 has pipe members 6 to 8, as shown in FIGS. 1 and 2. These pipe members 6 to 8 are cylindrical with hollow portions, and may preferably have circular cross-sections. Each pipe member 6 has a main body portion 6a, a leg portion 6b, and a mounting portion 6c that are continuous and integrated together. The main body portion 6a extends in the longitudinal direction along a side edge of the seat cushion 2.

The leg portion 6b extends downward from a front end portion of the main body portion 6a, as shown in FIGS. 1 and 2. A curved portion 6b1 that is continuous with the main body portion 6a is formed at an upper portion of the leg portion 6b and extends in an arc shape. The mounting portion 6c extends toward the rear from a lower end portion of the leg portion 6b. The mounting portion 6c is flattened in the radial direction such that the hollow portion thereof is smaller than the hollow portion at other portions (i.e., the main body portion 6a and the leg portion 6b) of the pipe member 6. As a result, the thickness in the vertical direction of the mounting portion 6c is less than that of the leg portion 6b. The upper portion and the lower portion of the mounting portion 6c may preferably contact each other. A curved portion 6b2 that is continuous with the mounting portion 6c and extends in an arc shape is formed at the lower portion of the leg portion 6b.

The pipe members 7 and 8 extend straight and each have a main body portion 7a and 8a and attaching portions 7b and 8b, as shown in FIG. 2. The main body portions 7a and 8a extend crosswise along front and rear edges of the seat cushion. The attaching portions 7b and 8b extend from both end portions of the main body portions 7a and 8a and are flattened in the vertical direction. The thickness in the vertical direction of the attaching portions 7b and 8b is less than that of the main body portions 7a and 8a. The upper portion and the lower portion of each attaching portion 7b and 8b may preferably contact one another. The attaching portions 7b and 8b are attached to the upper surface of the main body portions 6a of the pipe members 6 by welding.

A wire body 9 is attached to the pipe members 7 and 8, as shown in FIGS. 1 and 2. This wire body 9 includes a pair of first wires 9a and a pair of second wires 9b. The first wires 9a extend in the longitudinal direction. Each of the first wires 9a has a first portion 9a1 and a second portion 9a2 that are integrated together. The first portion 9a1 is welded at a front end portion to the upper surface of the pipe member 8, and extends downward and toward the rear from the pipe member 8. The second portion 9a2 extends upward and toward the rear from the rear end portion of a first portion 9a1, and the rear end portion of the second portion 9a2 is welded to the upper surface of the pipe member 7. The second wires 9b extend crosswise, and the left and right end portions of the second wires 9b are welded to the first wires 9a.

Brackets 10 and 11 are attached to rear portions of the pipe members 6, as shown in FIGS. 1 and 2. The brackets 10 and 11 are formed by metal plate members and each have a main body portion 10a and 11a and a mounting portion 10b and 11b that are integrated together. The main body portions 10a and 11a are abutted against outside surfaces of the main body portions 6a of the pipe members 6, and are attached to the pipe members 6 by welds around holes 10c and 11c formed in the main body portions 10a and 11a.

The mounting portion 10b and 11b of each brackets 10 and 11 extends from the lower end edge of the main body portion 10a and 11a toward the other bracket 10 and 11, as shown in FIG. 2. Each of the mounting portions 10b and 11b abuts against an upper surface 5b2 of an upper rail 5b of a sliding apparatus 5, and is attached to the upper rail 5b by a bolt 14 and a nut 15. A reclining apparatus 12 is attached to an upper portion of the main body portion 10a, and a pin member 13 is attached to an upper portion of the main body portion 11a. The frame body 3a of the seat back 3 is rotatably attached to the frame body 2a of the seat cushion 2 by the reclining apparatus 12 and the pin member 13.

The frame body 3a of the seat back 3 has a pipe member 3a2 and a side frame 3a1, as shown in FIG. 1. The side frame 3a1 is formed by a metal plate member, and extends in the vertical direction along a side edge of the seat back 3. One end portion of the pipe member 3a2 is attached to an upper portion of the side frame 3a1, and the pipe member 3a2 extends along one side edge, an upper edge, the other side edge, and a lower edge of the seat back 3. A tip end portion of the pipe member 3a2 is welded to a side surface of a side portion of the side frame 3a1.

The reclining apparatus 12 is attached to a lower portion of the side frame 3a1, as shown in FIG. 1. Therefore, the side frame 3a1 is attached to the seat cushion 2 by the reclining apparatus 12 such that the angle of the side frame 3a1 can be adjusted with respect to the seat cushion 2. A bracket 3a3 is attached to a side surface of a lower portion of the pipe member 3a2. This bracket 3a3 is rotatably attached to the bracket 11 by the pin member 13.

The vehicle seat 1 has a sliding apparatus 5 beneath the seat cushion 2, as shown in FIGS. 1 and 2. This sliding apparatus 5 has lower rails 5a, and upper rails 5b that are slidably attached to the lower rails 5a. The lower rails 5a are mounted to a floor of the vehicle by mounting members 5e, 5f, and 5g. Lock mechanisms 5c that can lock the upper rails 5b to the lower rails 5a are provided between the lower rails 5a and the upper rails 5b. The pair of lock mechanism 5c unlocks in conjunction with the operation of a release mechanism 5d.

Figure 3:
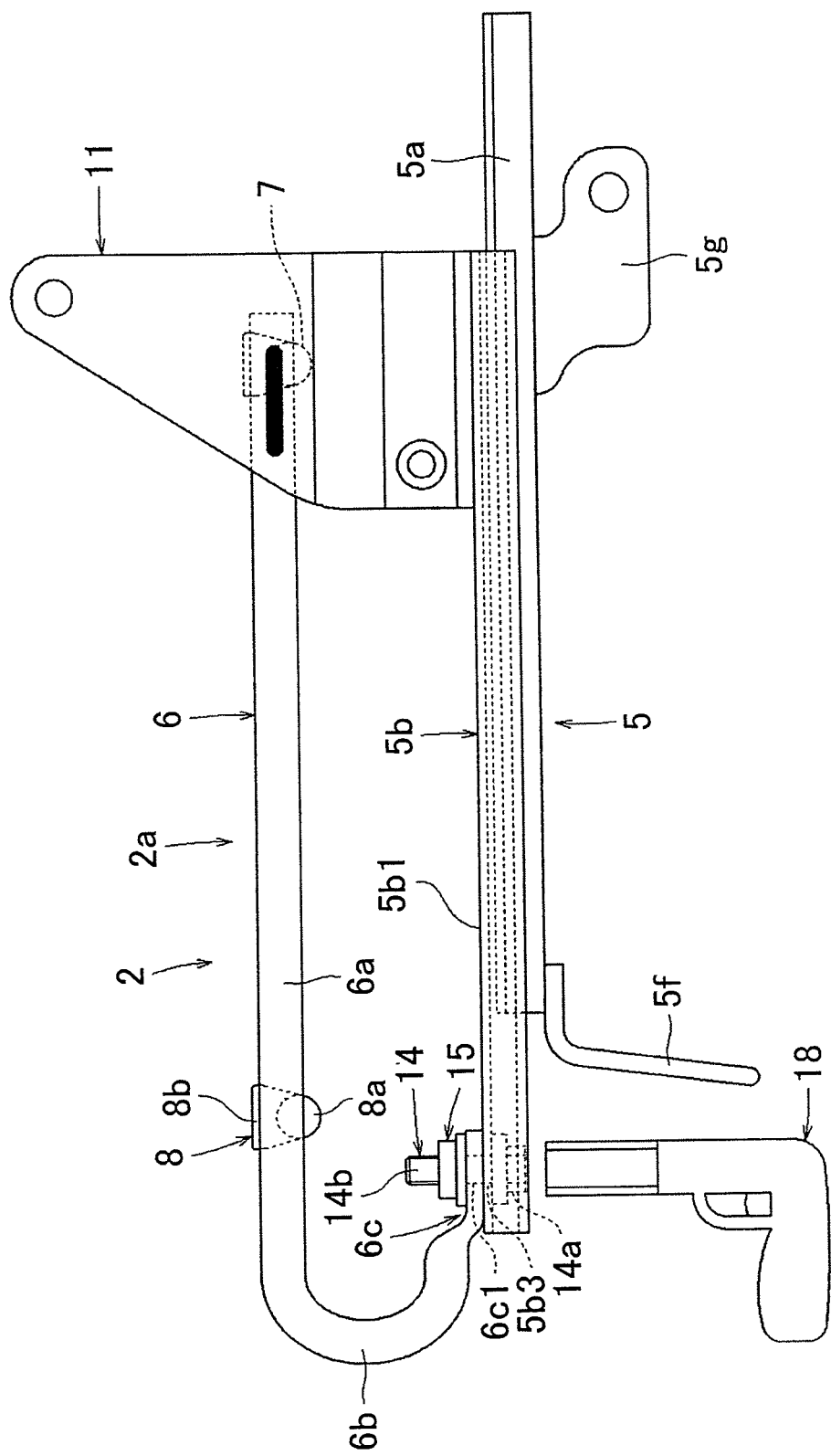
FIG. 3 is a partial side view of the vehicle seat at an area near the seat cushion.

When the frame bodies 2a are attached to the upper rails 5b, the front portions of the upper rails 5b are slid forward with respect to the lower rails 5a, as shown in FIG. 3. Next, the mounting portions 6c of the pipe members 6 are arranged on the upper surfaces 5b2 of front portions of the upper rails 5b. Shaft portions 14b of the bolts 14 are inserted into holes 5b3 in the upper rails 5b and holes 6c1 in the mounting portions 6c from underneath the upper rails 5b. The nuts 15 are screwed onto the shaft portions 14b from above the shaft portions 14b. The nuts 15 are held so as not to rotate using a tool, and head portions 14a of the bolts 14 are rotated using a tool 18. In this way, the frame body 2a is attached to the upper rails 5b.

As described above, the seat cushion 2 includes the frame body 2a that has the pipe members 6, as shown in FIG. 2. Each pipe member 6 has the main body portion 6a that extends along an end edge of the seat cushion 2, the leg portion 6b that extends downward toward the upper rail 5b from an end portion of the main body portion 6a, and the mounting portion 6c that extends from the lower end portion of the leg portion 6b and is flattened such that the hollow portion of the pipe member 6 is small, all integrated together. The mounting portion 6c has a flat surface that abuts against the upper rail 5b, and is attached to the upper rail 5b.

Therefore, the flat surfaces of the flattened mounting portions 6a of the pipe members 6 abut against the upper rails 5b. Accordingly, the pipe members 6 are able to be directly and easily mounted to the upper rails 5b without using a bracket. Thus, the number of parts of the vehicle seat 1 can be reduced.

As shown in FIG. 3, the flat surfaces of the mounting portions 6c abut against the upper surfaces 5b2 of the upper rails 5b. The mounting portions 6c are mounted to the upper rails 4b by the bolts 14 that pass through the upper rails 5b and the mounting portions 6c from underneath the upper rails 5b, and the nuts 15 that screw on to the bolts 14, while the upper rails 5b are made to protrude out with respect to the lower rails 5a.

Therefore, the mounting portions 6c are able to be mounted to the upper rails 5b by the bolts 14 and the nuts 15. Also, the end portions of the bolts 14 onto which the nuts 15 are screwed are positioned above the upper rails 5b, so the height of the upper rails 5b and the lower rails 5a can be reduced. For example, the height can be reduced compared with when the end portions of the bolts 14 are positioned between the upper rails 5b and the lower rails 5a.

As shown in FIG. 2, the main body portions 6a of the pipe members 6 extend in the longitudinal direction of the upper rails 5b. The leg portions 6b extend downward from one end portion of each main body portion 6a. The mounting portions 6c extend in the longitudinal direction of the upper rails 5b, toward the other end portion of the main body portions 6a from the lower end portion of the leg portions 6b, and abut against the upper surfaces 5b2 of the upper rails 5b.

Therefore, because the mounting portions 6c extend in the longitudinal direction of the upper rails 5b, the mounting portions 6c are able to abut against the upper rails 5b over a wide area. Thus, the mounting portions 6c are able to be stably mounted to the upper rails 5b. Further, the main body portions 6a and the mounting portions 6c extend in the same direction from the leg portions 6b, so the overall length of the pipe members 6 is shorter than it is would be if the main body portions 6a and the mounting portions 6c extended in different directions with respect to the leg portions 6b.

Other Example Embodiments

The invention is not limited to the example embodiment described above, but may also be carried out in other modes such as those described below. For example, the seat cushion 2 may have a frame body 2d shown in FIG. 4, instead of the frame body 2a shown in FIG. 2. The frame body 2d has pipe members 21 and 22, brackets 10 and 11, and a wire body 9, as shown in FIG. 4.

Figure 4:
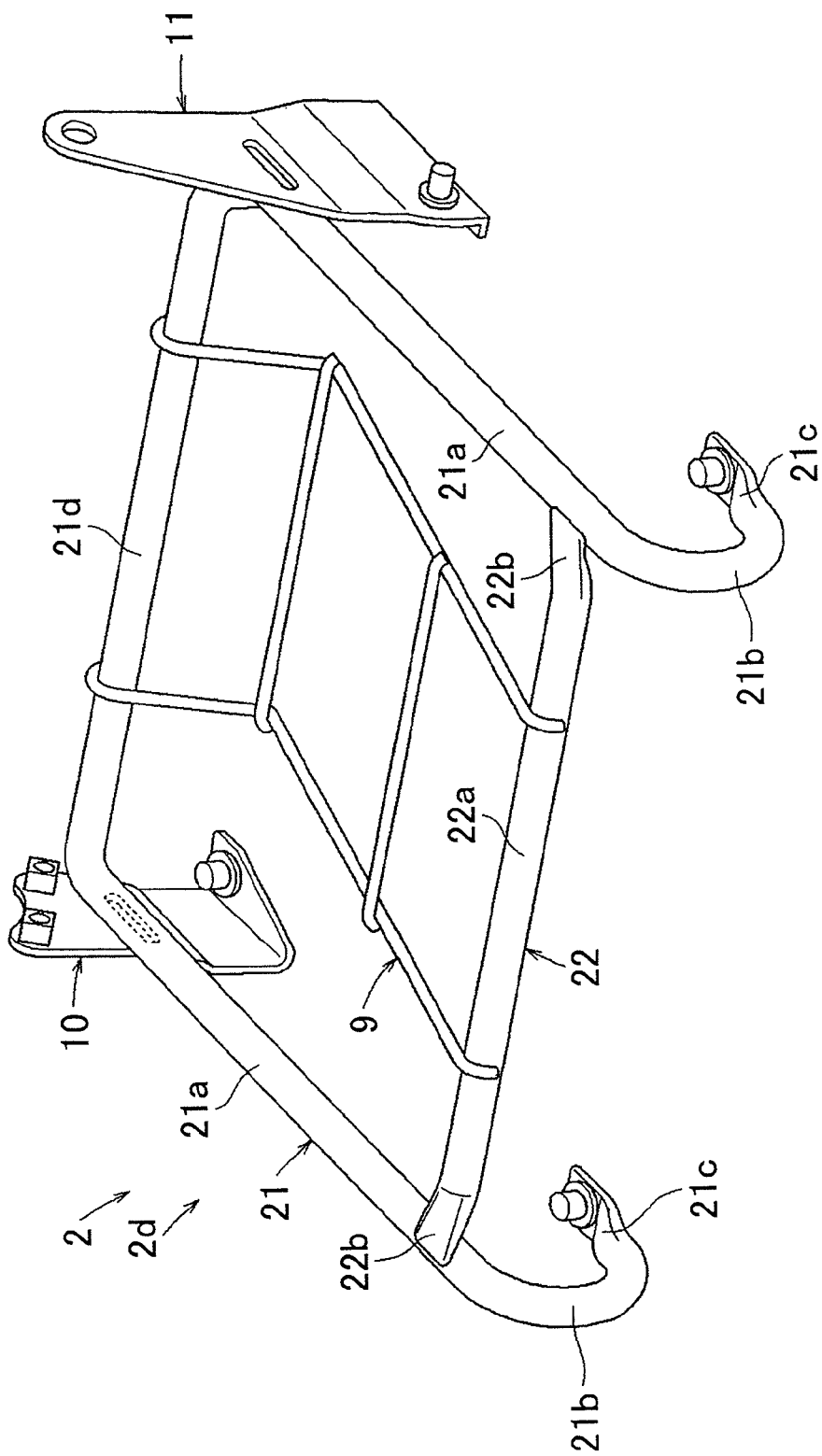
FIG. 4 is a perspective view of a frame body of a seat cushion according to another example embodiment of the invention.

The pipe member 21 has a pair of main body portions 21a and a connecting portion 21d that connects this pair of main body portions 21a together, integrated together, as shown in FIG. 4. The main body portions 21a extend in the longitudinal direction along the side edges of the seat cushion 2. The connecting portion 21d extends crosswise along the rear edge of the seat cushion 2, and connects the rear portions of the pair of main body portions 21a together. Leg portions 21b that extend downward from the main body portions 21a are provided on front end portions of the main body portions 21a. Mounting portions 21c that extend toward the rear from the leg portions 21b are provided on lower end portions of the leg portions 21b.

The pipe member 22 extends straight and has a main body portion 22a and a pair of attaching portions 22b integrated together, as shown in FIG. 4. The main body portion 22a extends crosswise along the front edge of the seat cushion 2. The attaching portions 22b are provided at both end portions of the main body portion 22a and are flattened in the vertical direction. The attaching portions 22b are welded to upper surfaces of the main body portions 21a of the pipe member 21. The wire body 9 is attached to the connecting portion 21d of the pipe member 21, and the pipe member 22. The bracket 10 is attached to one side surface of a rear portion of the pipe member 21, and the bracket 11 is attached to the other side surface of the rear portion of the pipe member 21.

Figure 5:
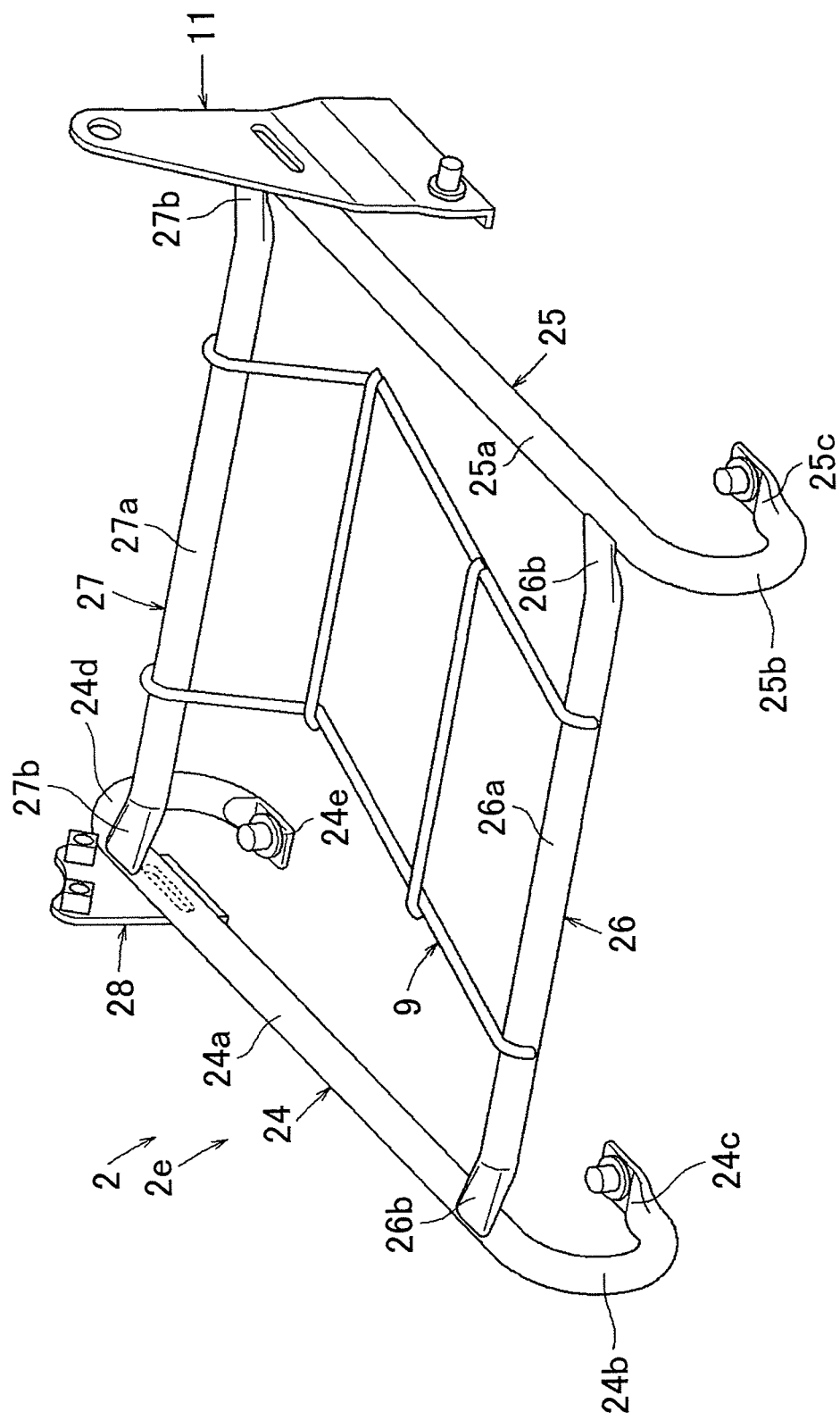
FIG. 5 is a perspective view of a frame body of a seat cushion according to yet another example embodiment of the invention.

Alternately, the seat cushion 2 may have a frame body 2e shown in FIG. 5, instead of the frame body 2a shown in FIG. 2. The frame body 2e has pipe members 24 to 27, brackets 11 and 25, and a wire body 9, as shown in FIG. 5.

The pipe member 24 has a main body portion 24a, a pair of leg portions 24b and 24d, and a pair of mounting portions 24c and 24e, integrated together, as shown in FIG. 5. The main body portion 24a extends in the longitudinal direction along a side edge of the seat cushion 2. The leg portions 24b and 24d extend downward from front and rear end portions of the main body portion 24a. The mounting portion 24c extends toward the rear from a lower end portion of the leg portion 24b, and the mounting portion 24e extends forward from a lower end portion of the leg portion 24d. The mounting portions 24c and 24e are flattened in the vertical direction and are mounted to the upper surfaces 5b2 of the upper rails 5b shown in FIG. 2.

The pipe member 25 has a main body portion 25a, a leg portion 25b, and a mounting portion 25c, all integrated together, as shown in FIG. 5. The main body portion 25a extends in the longitudinal direction along a side edge of the seat cushion 2. The leg portion 25b extends downward from a front end portion of the main body portion 25a. The mounting portion 25c extends toward the rear from a lower end portion of the leg portion 25b, and is flattened in the vertical direction. A bracket 11 is mounted to a side surface of a rear portion of the pipe member 25, and a bracket 28 is mounted to a side surface of a rear portion of the pipe member 24.

The pipe members 26 and 27 each extend straight and have a main body portion 26a and 27a and a pair of attaching portions 26b and 27b integrated together, as shown in FIG. 5. The main body portions 26a and 27a extend crosswise along the front and rear edges of the seat cushion 2. The attaching portions 26b and 27b are provided on both end portions of the main body portions 26a and 27a, and are flattened in the vertical direction. The attaching portions 26b and 27b are welded to the upper surfaces of the main body portions 24a and 25a of the pipe members 24 and 25. The wire body 9 is attached to the pipe members 26 and 27.

The pipe members may be cylindrical and have circular cross-sections as shown in FIG. 1, or they may be cylindrical and have oval or rectangular cross-sections. The pipe members may have the main body portions 6a, 21a, 24a, and 25a that extend along the side edges of the seat cushion 2, and the leg portions 6b, 21b, 24b, 24d, and 25b provided on the front and rear end portions of the main body portions 6a, 21a, 24a, and 25a as shown in FIGS. 2, 4, and 5, or main body portions that extend along the front and rear end edges of the seat cushion, and leg portions provided on left and right end portions of the main body portions.

The mounting portions of the pipe members may be flattened in the vertical direction and mounted to the upper surfaces 5b2 of the upper rails 5b, as shown in FIG. 2, or they may be flattened in the crosswise direction and mounted to side surfaces of the upper rails. The mounting portions of the pipe members may extend toward the rear from the lower end portions of the leg portions 6b as shown in FIG. 2, or they may extend forward or in the crosswise direction from the leg portions and mounted to the upper surfaces of the upper rails.

The seat cushion may have a sitting portion formed by the pad 2b that attaches to the frame body 2a as shown in FIG. 2, or it may have a sitting portion formed by a fabric member stretched over the frame body. The vehicle seat may also be mounted in a vehicle or mounted in a vessel or an aircraft or the like.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

What is claimed is:

1. A vehicle seat comprising:
a seat back;
a seat cushion; and
a sliding apparatus provided underneath the seat cushion, wherein
the sliding apparatus has a lower rail and an upper rail that slidably attaches to the lower rail,
the seat cushion has a frame body that includes a pipe member and a bracket defined by a metal plate member, the bracket being rotatably connected to the seat back;
the pipe member including:
a main body portion that extends along an end edge of the seat cushion;

a leg portion that aligned with the main body portion along a single plane in a seat forward-rearward direction and that curves downward toward the upper rail from an end portion of the main body portion; and a mounting portion that extends from a lower end portion of the leg portion, the mounting portion being a flattened portion of the pipe member integrated with the leg portion that defines a front terminal end of the pipe member, and a lowermost side of the mounting portion has a planar flat surface that abuts against an uppermost side of the upper rail, and is mounted to a front end of the upper rail, the uppermost side of the upper rail that abuts the lowermost side of the mounting portion is defined by a planar flat surface, a lower part of the bracket is attached to the upper rail, a width of the lower part of the bracket is greater than a width of an upper part of the bracket, the bracket includes an elongate hole extending in the seat forward-rearward direction, and a rear end of the pipe member extends along the elongate hole of the bracket and is welded to a surround of the elongate hole such that the rear end of the pipe member is mounted on the bracket.

2. The vehicle seat according to claim 1, wherein the main body portion of the pipe member extends in the seat forward-rearward direction, the leg portion extends downward from one end portion of the main body portion, and the mounting portion extends in the seat forward-rearward direction and toward the other end portion of the main body portion from the lower end portion of the leg portion, and abuts against an upper surface of the upper rail.

3. The vehicle seat according to claim 2, wherein the one end portion of the main body portion is a front end portion.

4. The vehicle seat according to claim 1, wherein a hollow portion of the mounting portion is smaller than a hollow portion of each of the main body portion and the leg portion of the pipe member.

5. The vehicle seat according to claim 1, wherein the planar flat surface of the uppermost side of the upper rail extends from a first end side to a second end side of the planar flat surface of the lowermost side of the mounting portion.

6. A vehicle seat comprising:
a seat back;
a seat cushion; and
a sliding apparatus provided underneath the seat cushion, wherein the sliding apparatus has a lower rail and an upper rail that slidably attaches to the lower rail, the seat cushion has a frame body that includes a pipe member and a bracket defined by a metal plate member, the bracket being rotatably connected to the seat back, the pipe member has-including:
a main body portion that extends along an end edge of the seat cushion;
a leg portion that is aligned with the main body portion along a single plane in a seat forward-rearward direction and that curves downward toward the upper rail from an end portion of the main body portion; and
a mounting portion that extends from a lower end portion of the leg portion, the mounting portion being a flattened portion of the pipe member integrated with the leg portion that defines a front terminal end of the pipe member, a lowermost side of the mounting portion has a planar flat surface that abuts against an uppermost side of the upper rail and is mounted to a front end of the upper rail by a bolt that extends through the upper rail and the mounting portion from underneath the upper rail and by nut that screw onto the bolt, the uppermost side of the upper rail that abuts the lowermost side of the mounting portion is defined by a planar flat surface, a lower part of the bracket is attached to the upper rail, a width of the lower part of the bracket is greater than a width of an upper part of the bracket, the bracket includes an elongate hole extending in the seat forward-rearward direction, and a rear end of the pipe member extends along the elongate hole of the bracket and is welded to a surround of the elongate hole such that the rear end of the pipe member is mounted on the bracket.

7. The vehicle seat according to claim 6, wherein the main body portion of the pipe member extends in the seat forward-rearward direction, the leg portion extends downward from one end portion of the main body portion, and the mounting portion extends in the seat forward-rearward direction and toward the other end portion of the main body portion from the lower end portion of the leg portion.

8. The vehicle seat according to claim 7, wherein the one end portion of the main body portion is a front end portion.

9. The vehicle seat according to claim 6, wherein a hollow portion of the mounting portion is smaller than a hollow portion of each of the main body portion and the leg portion of the pipe member.

10. The vehicle seat according to claim 6, wherein the planar flat surface of the uppermost side of the upper rail extends from a first end side to a second end side of the planar flat surface of the lowermost side of the mounting portion.

11. The vehicle seat according to claim 6, wherein the leg portion defines a continuous arc shape, from the end of the main body portion to the mounting portion, that extends beyond a terminal end of the upper rail in the seat forward-rearward direction.

12. A vehicle seat comprising:
a seat back;
a seat cushion; and
a sliding apparatus provided underneath the seat cushion, wherein the sliding apparatus has a lower rail and an upper rail that slidably attaches to the lower rail,
the seat cushion has a frame body that includes a pipe member and a bracket defined by a metal plate member, the bracket being rotatably connected to the seat back,
the pipe member including:
a main body portion that extends along an end edge of the seat cushion;
a leg portion that is aligned with the main body portion along a single plane in a seat forward-rearward direction and that curves downward toward the upper rail from an end portion of the main body portion; and
a mounting portion that extends from a lower end portion of the leg portion, the mounting portion being a flattened portion of the pipe member integrated with the leg portion that defines a front terminal end of the pipe member, a lowermost side of the mounting portion has a planar flat surface that abuts against an uppermost side of the upper rail, and is mounted to a front end of the upper rail, the uppermost side of the upper rail that abuts the lowermost side of the mounting portion is defined by a planar flat surface, the leg portion defines a continuous arc shape, from the end of the main body portion to the mounting portion, that extends beyond a terminal end of the upper rail in the seat forward-rearward direction, a lower part of the bracket is attached to the upper rail, a width of the lower part of the bracket is greater than a width of an upper part of the bracket, the bracket includes an elongate hole extending in the seat forward-rearward direction, and a rear end of the pipe member extends along the elongate hole of the bracket and is welded to a surround of the elongate hole such that the rear end of the pipe member is mounted on the bracket.

13. The vehicle seat according to claim 12, wherein the main body portion of the pipe member extends in the seat forward-rearward direction, the leg portion extends downward from one end portion of the main body portion, and the mounting portion extends in the seat forward-rearward direction and toward the other end portion of the main body portion from the lower end portion of the leg portion.

14. The vehicle seat according to claim 13, wherein the one end portion of the main body portion is a front end portion.

15. The vehicle seat according to claim 12, wherein a hollow portion of the mounting portion is smaller than a hollow portion of each of the main body portion and the leg portion of the pipe member.

16. The vehicle seat according to claim 12, wherein the planar flat surface of the uppermost side of the upper rail extends from a first end side to a second end side of the planar flat surface of the lowermost side of the mounting portion.

* * * * *